United States Patent Office 3,522,309
Patented July 28, 1970

3,522,309
REDUCTIVE ALKYLATION PROCESS FOR PRODUCTION OF N-ALKYLATED AMINES
Arthur Francis Kirby, Willingboro, N.J., assignor to E. I. du Pont de Nemours and Company, Wilmington, Del., a corporation of Delaware
No Drawing. Filed Aug. 31, 1967, Ser. No. 664,649
Int. Cl. C07c 85/08, 85/10
U.S. Cl. 260—577                                        8 Claims

ABSTRACT OF THE DISCLOSURE

Improvement in the reductive alkylation of amines and nitro compounds through the use of promoter quantities of lower alkanol or asymmetrically halogenated hydrocarbons comprising about from 5–20% by weight of the reaction mixture.

BACKGROUND OF THE INVENTION

Alkylated amines are widely used in the chemical industries as additives for various products. For example, these compounds have been demonstrated to promote thermal stability in certain polymers, they can be used as additives for natural and synthetic rubbers to improve resistance to cracking, as gasoline stabilizers against oxygen deterioration, and as solvents and plasticizers for various polyesters. These compounds are often prepared by the alkylation of an amine with an aldehyde or a ketone through the use of a catalyst under a reducing atmosphere. There is, consequently, a constant demand for improvements in this alkylation process which would reduce the cost of this synthesis and thereby further increase its commercial utility.

SUMMARY OF THE INVENTION

The instant invention provides an improvement in the production of N-alkylated amines which reduces the reaction time necessary for the alkylation, increases the conversion and yield, and reduces the temperature and pressure required for the reaction.

Specifically, the instant invention provides an improved process for the production of N-alkylated amines by contacting a nitrogen compound selected from ammonia, nitro compounds and primary and secondary amines, and preferably a primary aromatic amine, with a carbonyl compound selected from aldehydes and ketones having up to 20 carbon atoms in the presence of hydrogen and a reduction catalyst, the improvement which comprises adding to the reaction mixture about from 5 to 20%, based on the total weight of the reactants, of a polar liquid selected from lower alkanols, cycloalkanols, and asymmetrically halogenated hydrocarbons.

DESCRIPTION OF THE PREFERRED EMBODIMENTS

The process of the instant invention is applicable to ammonia and primary and secondary amines, including, for example, aromatic amines such as aniline, monomethylaniline, ethylaniline, diphenylamine, o-, m-, or p-toluidine, xylidines, mesidine, cumidine, phenylene diamines, naphthylamines, benzylamine, and phenylethylamine, and aliphatic amines such as ethylenediamine, methylamine, dimethylamine, ethylamine, diethylamine, n-propylamine, n-butylamine, laurylamine, and allylamine; and aromatic and aliphatic nitro compounds such as nitrobenzene, nitrophenols, nitroanilines, nitrocyclohexane, nitromethane, p-chloronitrobenzene, and p-nitroanisole, and mixtures of the above.

The carbonyl compounds which can be used in the process of the instant invention, include, for example, ketones such as acetone, methylethyl ketone, 3-pentanone, dimethyl ketone, methyl hexyl ketone, methyl heptyl ketone, acetophenone, propiophenone, and benzophenone, and aldehydes such as benzaldehyde, m-, p-tolualdehyde, cinnamic aldehyde, salicylaldehyde, amisaldehyde, vanillin, benzil, formaldehyde, acetaldehyde, proprionaldehyde, n-butylaldehyde, isobutyl-aldehyde, n-valeraldehyde, iso-valeraldehydre, n-caproaldehyde, n-hepaldehyde, stearaldehyde, acrolein, crotonaldehyde, and furfural.

In the process of the instant invention, the molar ratio of the principal reactants, the amine or nitro compound and the carbonyl compound, is not critical to the process. However, in general it is preferred that the nitrogen compound and carbonyl compound be supplied in a ratio of about from 1:1 to 1:10. The hydrogen atmosphere is conveniently supplied by carrying out the reaction under hydrogen pressure of about from 50 to 1500 p.s.i.g., and preferably a pressure of about from 200 to 250 p.s.i.g. The temperatures at which the reaction takes place are generally about from 50 to 150° C., and it is preferred that the reaction be carried out at about from 90 to 100° C.

Catalysts which can be used in the process of the instant invention include any of those catalysts generally used in the reductive alkylation of amines or nitro compounds, including, for example, the noble metal such as platinum and palladium; platinum-on-carbon; silica-on-alumina and cobalt-on-alumina. Other catalysts which can be used in this process include oxides such as silica, titania, zirconia, chromium, copper, and molybdenum oxides, as well as mixtures of the above. Of the catalysts indicated above, platinum catalysts are generally preferred for use with ketones in this process, while palladium catalysts have been found to be more efficient with aldehydes. Particularly preferred catalysts for this reaction are platinum-on-carbon catalysts, used in conjunction with phosphoric acid. The quantities of catalysts used generally comprise about 1% of the total weight of the reactants, the phosphoric acid co-catalyst comprising about from 1 to 3% by weight of the reactants, the preferred platinum concentration being about 100 p.p.m. of platinum to each part of amine or nitro compound. In the particular system employing aniline and acetone, a platinum-on-carbon catalyst concentration of about from 0.5–1.5% is especially preferred.

The quantity of the polar liquid additive used in the improved process of the instant invention is a critical feature of this invention. Generally, amounts of the additive below about 5% of the total weight of the reactants have little or no beneficial effect on the reaction, while quantities in excess of 20% of the total weight of the reactants tend to negate the beneficial effect of the additives by dilution of the reaction mixture, increasing the reaction times by diminishing the rate of reaction and the intimacy of the contact of the reactants. Therefore, to obtain the beneficial effect of the additives, quantities of about from 5–20% by weight of the total reactans should be used.

Polar liquids which can be used in accordance with the instant invention include lower alkanols including cycloalkanols, e.g., those having from 1–8 carbon atoms, such as methanol, ethanol, isopropanol, butanol, pentanol, cyclohexanol and cyclobutanol, as well as polar asymmetrically halogenated hydrocarbons, e.g., those having from 1–8 carbon atoms, such as chloroform, trifluorotrichloroethane, and trichlorofluoromethane, and mixtures of the above. Of the above, methanol and chloroform are particularly preferred for the process of the instant invention.

No unusual techniques are required in the process of the instant invention for the addition of the polar liquid to the reaction mixture. The additives can be simply admixed into the reaction mixture in the normal course of the combination of the reactants. The only critical feature of the addition, as indicated above, is that the quantity of additives comprise about from 5 to 20% of the weight of the total reactants. Naturally, to obtain maximum benefit from the addition, the polar liquid should preferably be added prior to the combination of the principal reactants.

The addition of polar liquids in accordance with the instant invention substantially reduces the reaction time of the conversion to the desired alkylated amine, and at the same time increases the conversion and yield of the reaction products. Furthermore, their use permits lower operating pressures in the course of the reaction, and improves the filtration characteristics of the reaction mixture for recovery of the catalyst. The addition of these compounds therefore results in greater overall operating efficiency of this process.

The instant invention is further illustrated by the following specific examples. In these examples, parts and percentages are by weight unless otherwise indicated.

EXAMPLE 1

Part A

Into a stainless steel autoclave is charged 18.6 parts of aniline, 35 parts of acetone, 12 parts methanol, 0.6 part phosphoric acid, and 0.2 parts of 1% platinum-on-carbon catalyst. The autoclave is then nitrogen flushed prior to hydrogen pressurization at 200 p.s.i.g. $H_2$ pressure. The autoclave temperature is then raised to 100° C. at which temperature the reaction is allowed to proceed until about 0.2 mol. of hydrogen is consumed. The autoclave pressure is maintained between about 170–200 p.s.i.g. by $H_2$ repressurization. After about 17 minutes, the requisite amount of hydrogen is absorbed. The autoclave and its contents are allowed to cool to room temperature, and the catalyst in the reaction mixture is removed by filtration. The filtrate is subjected to gas chromatographic analysis the results of which show a 91% conversion and a 97% yield of N-isopropyl aniline.

Part B

The experiment of Part A is repeated *except* that the methanol is omitted. This omission results in a 71% conversion to, and 84% yield of, N-isopropyl aniline after 124 minutes.

If Parts A and B of Example 1 are repeated, using nitrocyclohexane, benzylamine, ethylamine or N-isopropyl amine instead of aniline, a similar improvement in the reaction to the corresponding N-alkylated amine will result from the addition of methanol or chloroform.

Part C

The procedure of Part B is repeated, except that acetone equivalent to the volume of omitted methanol is added. A 87% conversion to, and 98% yield of, N-isopropyl aniline is obtained after 80 minutes.

Filtration of reaction mixtures of runs in which the methanol was omitted is only accomplished with difficulty; whereas, with methanol present, filtration is rapid and accomplished with relative ease.

EXAMPLES 2–5

The procedure of Example 1A is repeated, substituting 14 part quantities of the indicated additions for methanol. The results are tabulated in Table I below, including the conversion to and yield of N-isopropyl aniline.

TABLE I.—REDUCTIVE ALKYLATION OF ANILINE

| | Additive | Reduction time min. | Percent conversion | Percent yield |
|---|---|---|---|---|
| Example: | | | | |
| 2 | Ethanol | 31 | 82 | 94 |
| 3 | Isopropanol | 35 | 83 | 93 |
| 4 | Cyclohexanol | 100 | 83 | 95 |
| 5 | Chloroform | 14 | 92 | 97 |

EXAMPLES 6–9

In Examples 6–9, the experimental procedure of Example 1, Parts A and B, is repeated, using the reactants to obtain the results indicated in Table II.

TABLE II.—REDUCTIVE ALKYLATION OF AMINES WITH CARBONYL COMPOUNDS

| Reactants | Additive | Reduction time, minutes | Percent conversion | Percent yield |
|---|---|---|---|---|
| Example: | | | | |
| 6 Acetophenone and aniline | None (control) | 100 | 30 | 95 |
| | Methanol | 100 | 70 | 95 |
| Resulting compound: N-1-phenylethyl aniline | | | | |
| 7 p-Toluidine and acetone | None (control) | 29 | 98 | 98 |
| | Methanol | 24 | 98 | 98 |
| Resulting compound: N-isopropyl p-toluidine | | | | |
| 8 Aniline and methyl ethyl ketone | None (control) | 112 | 90 | 95 |
| | Methanol | 35 | 90 | 95 |
| Resulting compound: N-isobutyl aniline | | | | |
| 9 Nitrobenzene and acetone | None (control) | 77 | 6 | |
| | Methanol | 55 | 12 | |
| Resulting compound: N-isopropyl aniline | | | | |

I claim:

1. In the process for the production of N-alkylated amines by contacting a nitrogen compound selected from ammonia aromatic, nitro compounds, and primary and secondary aromatic amines with a carbonyl compounds selected from aldehydes and ketones having up to 20 carbon atoms, wherein said nitrogen compound and said carbonyl compound are supplied at a ratio of 1:1 to 1:10 respectively in the presence of hydrogen and a reduction catalyst at a temperature in the range 50–150° C., the improvement which comprises adding to the reaction mixture about from 5–20% based on the total weight of the reactants of at least one polar liquid selected from lower alkanols and asymmetrically halogenated hydrocarbons having 1–8 carbon atoms.

2. A process of claim 1 wherein the nitrogen compound is a primary aromatic amine and the carbonyl compound is a ketone.

3. A process of claim 2 wherein the polar liquid is methanol.

4. A process of claim 2 wherein the polar liquid is ethanol.

5. A process of claim 2 wherein the polar liquid is chloroform.

6. A process of claim 2, conducted at a temperature in the range 90–100° C. and a pressure in the range 200–250 p.s.i.g.

7. A process of claim 3 conducted at a temperature in the range 90–100° C. and a pressure in the range 200–250 p.s.i.g.

8. A process for the production of N-isopropyl aniline which comprises contacting aniline with acetone in a hydrogen atmosphere at a pressure of about from 50 to 1500 p.s.i.g. and at a temperature of about from 50° to 150° C. in the presence of a platinum-on-carbon catalyst, a phosphoric acid cocatalyst, and about from 5–20%, based on the total weight of the reactants of a polar liquid selected from methanol and chloroform.

References Cited

UNITED STATES PATENTS

| | | | |
|---|---|---|---|
| 1,989,325 | 1/1935 | Lommel et al. | |
| 2,219,879 | 10/1940 | Vanderbilt | 260—583 |
| 2,373,705 | 4/1945 | Olin et al. | 260—583 |
| 2,636,051 | 4/1953 | Whetstone et al. | |
| 3,316,261 | 4/1967 | Speranza et al. | 260—577 X |

CHARLES B. PARKER, Primary Examiner

R. L. RAYMOND, Assistant Examiner

U.S. Cl. X.R.

260—563, 583, 585

PO-1050
(5/69)

UNITED STATES PATENT OFFICE
CERTIFICATE OF CORRECTION

Patent No. 3,522,309　　　　　　　　Dated July 28, 1970

Inventor(s) ARTHUR FRANCIS KIRBY

It is certified that error appears in the above-identified patent and that said Letters Patent are hereby corrected as shown below:

In Claim 1 at column 4, line 55, add a comma -- , -- after the word ammonia; delete the comma "," after the word aromatic; column 4, line 56, the word "compounds" should read -- compound -- .

SIGNED AND
SEALED
OCT 20 1970

(SEAL)
Attest:

Edward M. Fletcher, Jr.
Attesting Officer

WILLIAM E. SCHUYLER, JR.
Commissioner of Patents